United States Patent

Suzuki

[11] Patent Number: 5,668,666
[45] Date of Patent: Sep. 16, 1997

[54] ZOOM LENS WITH AN ANAMORPHIC CONVERTER

[75] Inventor: Takeshi Suzuki, Kanagawa-ken, Japan

[73] Assignee: Nikon Corporation, Tokyo, Japan

[21] Appl. No.: 577,530

[22] Filed: Dec. 22, 1995

[30] Foreign Application Priority Data

Jan. 5, 1995 [JP] Japan ................... 7-015533

[51] Int. Cl.$^6$ ............ G02B 15/02; G02B 15/14; G02B 9/60
[52] U.S. Cl. .................. 359/674; 359/683; 359/765
[58] Field of Search ................ 359/674, 668, 359/670, 671, 681, 682, 765, 755, 756, 763, 683

[56] References Cited

U.S. PATENT DOCUMENTS

| 3,751,136 | 8/1973 | Kirhoff | 359/669 |
| 4,146,305 | 3/1979 | Tanaka | 359/674 |
| 4,318,592 | 3/1982 | Tanaka | 359/674 |
| 4,330,180 | 5/1982 | Tanaka | 359/674 |
| 5,097,360 | 3/1992 | Fukami | 359/674 |

FOREIGN PATENT DOCUMENTS 54-137329 10/1979 Japan .
54-135546 10/1989 Japan .
5-346534 12/1993 Japan .

*Primary Examiner*—Georgia Y. Epps
*Assistant Examiner*—Jordan M. Schwartz
*Attorney, Agent, or Firm*—Oliff & Berridge

[57] ABSTRACT

The present invention provides an zoom lens with an anamorphic converter that is small, light weight, has high precision, and also high performance. The zoom lens includes, in order from the object side, a first lens group with positive refractive power, a second lens group with negative refractive power, a third lens group with positive and negative refractive power, a fourth lens group with positive refractive power, and a fifth lens group with positive refractive power. The second lens group moves along the optical axis and first lens group is fixed along the optical axis when zooming from the maximum wide-angle state to the maximum telephoto state. An anamorphic converter lens group GA is provided freely attachable and detachable in the optical path in the gap between the fourth lens group and the fifth lens group in which the magnification in a specified plane including the optical axis and the magnification in a perpendicularly intersecting plane including the optical axis are mutually differ, in which the following condition is satisfied:

$$0.3<|f1/f2|^{1/2}<0.9.$$

23 Claims, 6 Drawing Sheets

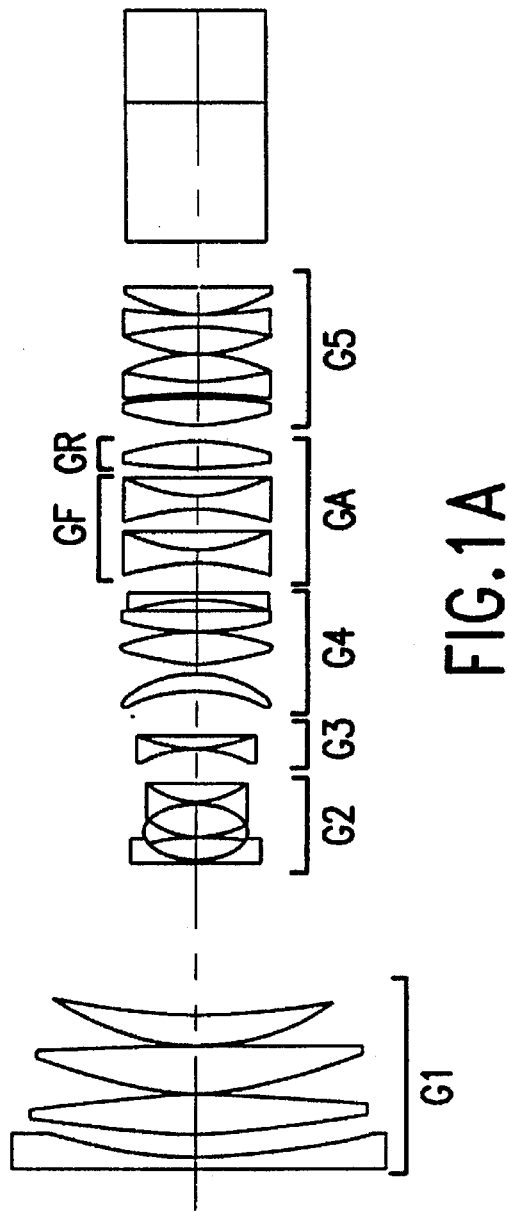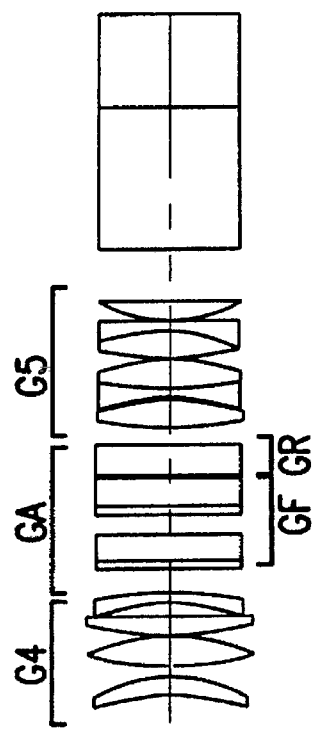
FIG.1A
FIG.1B

ZOOM LENS WITH AN ANAMORPHIC CONVERTER

BACKGROUND OF THE INVENTION

1. Field of the Invention

This invention relates to a zoom lens with an anamorphic converter. In particular, the invention relates to a small, light weight zoom lens for a television camera or other camera that requires a high zoom ratio and a large aperture. An anamorphic converter that differs in the magnification in the vertical direction and the horizontal direction is freely attachable and detachable in order to selectively use the conversion of the length-breadth ratio of the image.

2. Background of Related Art

Conventionally, zoom lenses with a large aperture and high zoom ratio have a four-group construction. Lens groups are generally arranged in order from the object side having a positive—negative—negative—positive or positive—negative—positive—positive refractive power arrangement. Also, during zooming from the maximum wide-angle state to the maximum telephoto state, the second lens group and the third lens group move along the optical axis.

Moreover, conventionally, there have been various proposals for a converter that may be detachably installed either to the object side or the image side of the zoom lens. The attachment changes the length-breadth ratio of the image.

In recent years, while zoom lenses have had a large aperture, wide image angle, and a wide zoom ratio, there has been increased demand for a high performance zoom lens that is small and light weight. In general, while maintaining or decreasing the size and lightening the weight of the zoom lens, the method of strengthening the refractive power of each lens group is used, in order to achieve the required high specifications of the zoom lens. However, simply strengthening the refractive power of each lens group causes a decrease in image formation performance and sacrifices the correction of various aberrations.

Also, for television cameras, it is required that the zoom lens side (including converters) corresponds to the conversion and such of the aspect ratio. The correspondence improves performance and allows decrease in size of the solid television camera component by means of technological development.

In addition, the converter is installed so as to be attachable to and detachable from the image side and the object side of the zoom lens. Even with the conventional system listed above that records images and changes the length-breadth ratio of the image, the large size of the zoom lens system is inconvenient.

SUMMARY OF THE INVENTION

The zoom lens of this invention was made in view of the above-mentioned problems. An objective of the present invention is to provide a zoom lens with an anamorphic converter with high performance, high precision and that is small and light weight.

For purposes of clarity, the lens assembly described herein refers to lens groups, which are also known as lens units. A lens group is intended to cover a plurality of lens elements or components that work together as a group or a single lens element or component. Each lens element is intended to broadly cover all possible optical components, such as prisms.

In order to resolve the above-mentioned problems, the present invention provides a zoom lens with an anamorphic converter. The zoom lens includes, in order, from the object side, a first lens group having positive refractive power, a second lens group having negative refractive power, a third lens group having positive or negative refractive power, a fourth lens group having positive refractive power, and a fifth lens group having positive refractive power. The second lens group moves along the optical axis at the magnification from the maximum wide-angle state to the maximum telephoto state, and the first lens group G1 is fixed along the optical axis. An anamorphic converter lens group is arranged to be freely attachable and detachable in the optical path between the fourth lens group and the fifth lens group.

The anamorphic converter causes the magnification within a specified plane including the optical axis and the magnification within a plane intersecting perpendicularly to the specified plane including the optical axis to differ from one another. The following condition is satisfied when given f1 as the focal length of the first lens group and f2 as the focal length of the second lens group:

$$0.3 < |f1/f2|r^{-1/2} < 0.9$$

According to an embodiment of this invention, at least one lens surface is constructed as an aspherical shape in at least one lens group from the first lens group G1 to fifth lens group G5.

In the present invention, the anamorphic converter lens group has a first magnification within a specified plane including the optical axis and a second magnification within a second plane that is perpendicular to and perpendicularly intersects the specified plane. The first and second magnifications differ from one another. The converter lens group is freely attachable and detachable in the optical path between the fourth lens group and the fifth lens group of the zoom lens. The zoom lens can be made small and light, and the desired picture can be improved by making the zoom lens so that it has high precision and high performance.

For example, when the anamorphic converter lens group is installed on the object side of the main zoom lens system, the overall lens system becomes large. Moreover, a focus mechanism becomes necessary at the anamorphic converter lens group part. Therefore, along with the overall device becoming larger, the focus operation becomes problematic.

Also, when the anamorphic converter lens group is attached to the image side of the main zoom lens system, if lengthening the back focus is attempted, enlargement of the attachment occurs. Moreover, since the image side of the main zoom lens system is a part of the image formation system, the light beam incidental to the anamorphic converter lens group has a large angle of view. This results in a severe difference in the gap between the meridional plane and the sagittal plane with respect to the astigmatism. Correcting aberrations therefore becomes problematic.

Consequently, with this invention, the anamorphic converter lens group is attached to the middle of the main zoom lens system. In other words, it is constructed such that in the gap between the fourth lens group and the fifth lens group, the on-axis rays become approximately parallel light. The anamorphic converter lens group is arranged to be freely attachable and detachable between the fourth lens group and the fifth lens group.

In this way, with the present invention, the anamorphic converter lens group is positioned in the gap between the fourth lens group and the fifth lens group of the zoom lens. Because of this, a measurable decrease in size and weight occurs. Moreover, in addition to achieving improved performance and specifications, the desired image can be obtained.

A condition of the present invention is described below. The zoom lens of this invention should satisfy the condition (1).

$$0.3 < |f1|/2 r^{-1/2} < 0.9 \tag{1}$$

whereupon f1 is a focal length of the first lens group and f2 is a focal length of the second lens group.

The condition (1) establishes an appropriate scope for the proportion of the focal length of the first lens group and the focal length of the second lens group.

If the upper limiting value of the condition (1) is exceeded, the refractive power of each lens group becomes too strong and various aberrations increase. Also Petzval's sum becomes a negative number with a large absolute value, and correction of the aberrations becomes problematic.

Conversely, when Petzval's sum drops below the lower limiting value of conditional expression (1), the power of each lens group becomes weaker and various aberrations become smaller. However, the lens diameter must be increased as well, and it becomes impossible achieve the decrease in size and weight that is the purpose of this invention.

Also, with this invention, in at least one lens group from the first lens group to the fifth lens group, it is desirable that at least one lens surface is aspherical.

As described, while achieving the measurable decrease in size and weight, it becomes possible to improve the performance through the installation of an aspherical surface on at least one lens surface.

In the zoom lens of this invention, the first lens group has positive refractive power, and the second lens group has negative refractive power.

Consequently, when the first lens group G1 holds an aspherical lens, a specific construction is required to satisfactorily correct aberrations at each lens group interior. Whereas the spherical surface has a paraxial curvature radius, it is desirable for the aspherical surface to be constructed so that facing the perimeter from the optical axis the positive refractive power gradually becomes weaker (the negative refractive power gradually becomes stronger).

On the other hand, in the case where the second lens group G2 has an aspherical lens, an alternative construction is desired. In contrast with the spherical surface with paraxial curvature radius, the aspherical surface should be constructed so that facing the perimeter from the optical axis the positive refractive power gradually becomes stronger (the negative refractive power gradually becomes weaker).

Also, it is desirable that the aspherical lens at the first lens group and the second lens group satisfy the following condition (2):

$$0.0001 < |x(h)|/h < 0.1 \tag{2}$$

where h is the maximum effective diameter of aspherical lens and x(h) is the aspherical amount pertaining to height of maximum effective diameter h.

Moreover, the aspherical amount is defined as the distance along the optical axis of the aspherical surface and spherical surface that is established at the apex curvature radius.

Along with correcting satisfactorily the various aberrations, the condition (2) establishes an appropriate scope of aspherical surface amount in order to easily construct the aspherical lens.

First, in the case where the first lens group has an aspherical lens, when the upper limiting value of the condition (2) is exceeded, the aspherical surface amount is widely increased, and the construction of aspherical lens becomes extremely problematic. Conversely, when the value falls below the lower limiting value of the condition (2), the corrections of the aspherical aberrations of the telephoto side become insufficient.

On one hand, when the second lens group has an aspherical lens, if the upper limiting value of the condition (2) is exceeded, the distortion aberration of the reel shape from the intermediate focal length state to the telephoto side is enlarged. Conversely, when the value falls below the lower limiting value of condition (2), the variable of various aberrations from zooming, especially the variable of image surface curvature, becomes remarkable. Also, the spherical aberrations of the telephoto side receive a correction surplus.

Also by the present invention, the anamorphic converter lens group has a front group with negative refractive power within the specified plane and a rear group with positive refractive power within the specified plane. Moreover, the anamorphic converter lens group has at least one cemented lens, and it is desirable to satisfy the following condition (3)

$$0.5 < \gamma < 1.0 \tag{3}$$

where, $\gamma$ is an angle magnification of anamorphic converter lens group.

The image plane is compressed in an inward direction by the anamorphic converter lens group. The condition (3) establishes the appropriate scope of the angle magnification of the anamorphic converter lens group.

Because the specified space between the fourth lens group and the fifth lens group in the main zoom lens system is fixed, when the value drops below the lower limiting value of the condition (3), the power of each lens group of anamorphic converter lens group GA must be further strengthened. This results in the enlarging of various aberrations that are difficult to satisfactorily correct. Conversely, when various aberration correction weaken the power of each lens group of the anamorphic converter lens group up to the limit, the entire length of the anamorphic converter lens group is stretched. It then becomes impossible to achieve the required small size and light weight specifications of the main zoom lens system.

On the other hand, when the value exceeds the upper limiting value of the condition (3), the imaging plane is not compressed in the inward direction of the specified plane by means of anamorphic converter lens group.

Moreover, the anamorphic converter lens group has in the order from the object side, a front group with negative refractive power within the specified plane and the rear group GR with positive refractive power within the specified plane. Because of this, the aberrations are more satisfactorily corrected, and it becomes possible to achieve the simplicity of construction and reduction in size and weight.

In order to obtain an appropriate angle magnification scope and compress the imaging plane in the direction inward of the specified plane, the anamorphic converter lens group becomes fundamentally a reverse Galilean system (negative lens group and positive lens group in order from the object side). Consequently, it only increases those other excess lens groups even if the refractive power arrangement beyond the previously mentioned is used at the anamorphic converter lens group GA. This results in the number of constructed lenses increasing and, along with this, the lens outside diameter gets larger.

Moreover, variation of the image plane accompanies the zooming of the zoom lens. To correct this image plane variation, it is desirable to move along the optical axis the third lens group, all of or part of the fourth lens group, or all of or part of the fifth lens group.

This is because the lens diameter of the first lens group increases and the desired movement amount also gets larger if the first lens group is used as a correcting lens.

Also, the focal image formation position at the time when the anamorphic converter lens group GA is attached in relation to the focal image formation position of the main zoom lens system must be fixed. Where the exit pupil of the zoom lens in the state where the anamorphic converter lens group has been released is positioned nearer to the object side, it is desirable that the anamorphic converter lens group has a negative composite refractive power in the specified plane.

On the other hand, when the exit pupil of the zoom lens in the state where the anamorphic converter lens group is released is positioned nearer the image side, it is desirable that the anamorphic converter lens group has positive composite refractive power in the specified plane.

In the case where the composite refractive power of the anamorphic converter lens group does not satisfy the above-mentioned condition, the focal image formation position at the time when the anamorphic converter lens group is attached to it becomes largely out of focus at the object side and the image side in relation to the focal image formation position of the main zoom lens system. This results in the undesirable size increase of such things as the lens system, barrel, or the like.

Also, in order to efficiently obtain the magnification at the anamorphic converter lens group and moreover in order to make the lens small and light weight, it is desirable that a lens surface nearest the object side of anamorphic converter lens group has a convex surface facing the image side.

BRIEF DESCRIPTION OF THE DRAWINGS

The invention will be described in detail with reference to the following drawings in which like reference numerals refer to like elements and wherein:

FIGS. 1(a) and 1(b) show the lens structure of the zoom lens of a first embodiment of the present invention;

DETAILED DESCRIPTION OF PREFERRED EMBODIMENTS

Figure 2A:
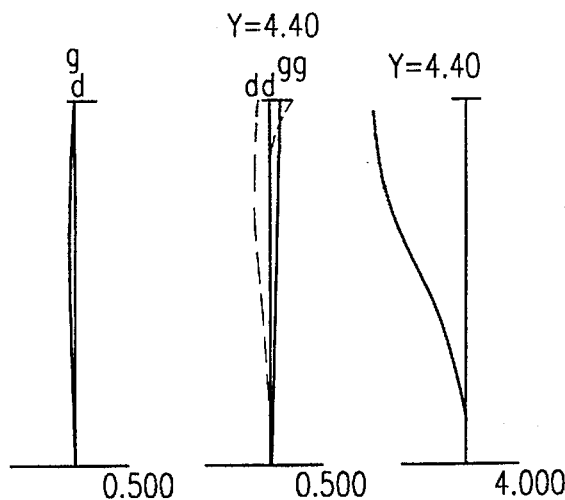
FIG. 2 shows various aberrations pertaining to the horizontal direction of the first embodiment in which (a) shows the aberrations pertaining to the maximum wide-angle state, (b) shows the aberrations pertaining to the intermediate focal length state, and (c) shows the aberrations pertaining to the maximum telephoto state.

Each preferred embodiment of the present invention is explained hereafter, based on the accompanying figures.

The zoom lens of each embodiment of the present invention comprises, in the order from the object side, a first lens group G1 with positive refractive power, a second lens group G2 with negative refractive power, a third lens group G3 with negative or positive refractive power, a fourth lens group G4 with positive refractive power, and a fifth lens group G5 with positive refractive power. When there is zooming from the wide angle state to the telephoto state, the first lens group G1 is fixed along the optical axis and the second lens group G2 moves along the optical axis.

FIG. 1A shows the lens construction of a zoom lens of the first embodiment of the present invention.

The zoom lens of FIG. 1A is constructed of, in order from the object side, the first lens group G1 comprising a negative meniscus lens with a convex surface facing the object side, a biconvex lens, a biconvex lens, and a positive meniscus lens with a convex surface facing the object side; the second lens group G2 comprising a negative meniscus lens with a convex surface facing the object side, a biconcave lens, a biconvex lens, a cemented lens including a biconvex lens and biconcave lens; the third lens group G3 comprising a cemented lens including a biconvex lens and biconcave lens; the fourth lens group G4 comprising a positive meniscus lens having a concave surface facing the object side, biconvex lens, biconvex lens, and a negative meniscus lens having a concave surface facing the object side; and the fifth lens group G5 comprising, a biconvex lens, a cemented lens including a biconvex lens and a biconcave lens, a cemented lens including a negative meniscus lens having a concave surface facing the object side and a biconvex lens, and a positive meniscus lens having a convex surface facing the object side.

Moreover, an anamorphic converter lens group GA between the fourth lens group G4 and the fifth lens group G5 is composed of, in the horizontal direction, a front group GF comprising a cemented lens including a positive meniscus lens having the convex surface facing the object side and a biconcave lens and a cemented lens composed of a biconvex lens and a biconcave lens, and having overall negative refractive power, and a rear group GR comprising a biconvex lens and having positive refractive power overall. As illustrated, the anamorphic converter lens group GA is a cylindrical construction that has refractive power in the horizontal direction but does not have refractive power in the vertical direction.

Table (1) displays various values for the first embodiment of this invention. Table (1) shows f as the focal length and Bf as the back focus. Moreover, the surface number shows the order of the lens surface from the object side along the direction of propagation of the light ray. The refractive index of refraction and the Abbe number ($\lambda$=587.6 nm) are also shown.

Table (1) shows only the value pertaining to the horizontal direction as the curvature radius of each lens surface of the anamorphic converter lens group GA. Moreover, the curvature radius of each lens surface pertaining to the vertical direction of the anamorphic converter lens group GA is zero (a flat plane). Also, in the gap between the surface that is nearest the image side on the lens and the image surface, parallel flat plane boards such as a color dividing prism or various types of filters can be arranged to correct aberrations including these parallel flat plain boards as seen in FIG. 1B. The values of parallel plane boards are also shown in Table 1.

The height in the direction perpendicular to the optical axis is given as y, the variable power amount in the optical axis direction pertaining to the height y is given as S(y), and the standard curvature radius, that is, the apex curvature radius, is given as r, the cylindrical coefficient is given as k, and the aspherical coefficient of the n-th order is given as Gn. The aspherical surface is shown by the following equation (a).

$$S(y) = (y^2/r)/\{1 + [1 - (1+k) \cdot (y/r)^2]^{1/2}\} + \quad (a)$$
$$C_2 \cdot y^2 + C_4 \cdot y^4 + C_6 \cdot y^6 + C_8 \cdot y^8 +$$
$$C_{10} \cdot y^{10} + \ldots$$

Also the paraxial curvature radius R of the aspherical surface is defined by the following equation (b)

$$R = 1/(2 \cdot C_2 + 1/r) \quad (b)$$

TABLE 1 f = 6.5–30–93

| Surface Number | Curvature Radius | Surface Space | Abbe Number | Refraction Ratio |
|---|---|---|---|---|
| 1 | 594.401 | 2.5 | 25.41 | 1.80518 |
| 2 | 88.703 | 5.6 | | |
| 3 | 182.466 | 8.1 | 82.42 | 1.49782 |
| 4 | −182.466 | 0.1 | | |
| 5 | 73.432 | 10.3 | 67.87 | 1.59319 |
| 6 | −416.295 | 0.1 | | |
| 7 | 49.283 | 6.7 | 67.87 | 1.59319 |
| 8 | 131.107 | d8 = variable | | |
| 9 | 118.637 | 0.9 | 43.35 | 1.84042 |
| 10 | 15.127 | 4.7 | | |
| 11 | −43.998 | 0.9 | 43.35 | 1.84042 |
| 12 | 26.346 | 0.1 | | |
| 13 | 20.559 | 5.8 | 30.83 | 1.61750 |
| 14 | −21.293 | 0.6 | | |
| 15 | −17.982 | 0.9 | 39.82 | 1.86994 |
| 16 | 31.870 | 2.9 | 23.01 | 1.86074 |
| 17 | −81.120 | d17 = variable | | |
| 18 | −26.577 | 0.9 | 43.35 | 1.84042 |
| 19 | 41.968 | 3.1 | 23.01 | 1.86074 |
| 20 | −199.087 | d20 = variable | | |
| 21 | −44.596 | 3.7 | 65.77 | 1.46450 |
| 22 | −24.481 | 2.0 | | |
| 23 | 45.292 | 6.2 | 82.52 | 1.49782 |
| 24 | −56.116 | 0.2 | | |
| 25 | −39.536 | 4.0 | 65.77 | 1.46450 |
| 26 | −278.620 | 3.2 | | |
| 27 | −39.023 | 2.2 | 35.72 | 1.90265 |
| 28 | −68.847 | 6.0 | | |
| 29 | −31.746 | 1.5 | 61.09 | 1.58913 |
| 30 | 26.323 | 4.5 | 23.01 | 1.86074 |
| 31 | 201.532 | 4.0 | | |
| 32 | −50.310 | 1.5 | 33.75 | 1.64831 |
| 33 | 29.275 | 6.0 | 82.52 | 1.49782 |
| 34 | −64.436 | 1.0 | | |
| 35 | 94.377 | 6.0 | 69.98 | 1.51860 |
| 36 | −42.823 | 3.8 | | |
| 37 | 59.694 | 5.8 | 65.77 | 1.46450 |
| 38 | −45.494 | 0.7 | | |
| 39 | −59.682 | 1.5 | 39.82 | 1.86994 |
| 40 | 46.113 | 6.7 | 56.41 | 1.50137 |
| 41 | −36.893 | 0.2 | | |
| 42 | 109.630 | 6.5 | 56.41 | 1.50137 |
| 43 | −25.283 | 1.5 | 39.82 | 1.86994 |
| 44 | −152.422 | 0.2 | | |
| 45 | 31.114 | 4.2 | 56.41 | 1.50137 |
| 46 | 4879.142 | 10.0 | | |
| 47 | ∞ | 30.0 | 38.03 | 1.60342 |
| 48 | ∞ | 16.2 | 64.10 | 1.51680 |
| 49 | ∞ | Bf = 1.2819 | | |

TABLE 1-continued (Variable space pertaining to variables)

| f | 6.5 | 30.0 | 93.0 |
|---|---|---|---|
| d8 | 0.69 | 30.83 | 40.77 |
| d17 | 42.76 | 7.61 | 3.15 |
| d20 | 3.13 | 8.13 | 2.65 |

(Conditions concerning values)

f1 = 61.6
f2 = −11.6
(1) |f1/f2|Γ$^{−1/2}$ = 0.434
(3) Γ = 0.75

Moreover, the exit pupil of the zoom lens in the situation where the anamorphic converter lens group GA is released is positioned at the side opposite the object side only 279.9 mm apart from the image plane. Also the composite focal length of the anamorphic converter lens group GA, fAB, =2658.6 mm in the horizontal direction. In other words, the anamorphic converter lens group GA has positive refractive power in the horizontal direction.

In this regard, the focal length fA of the front group GF of anamorphic converter lens GA, is equal to −44.2 mm. The focal length fB of rear group GR is equal to 57.6 mm.

Figure 2B:
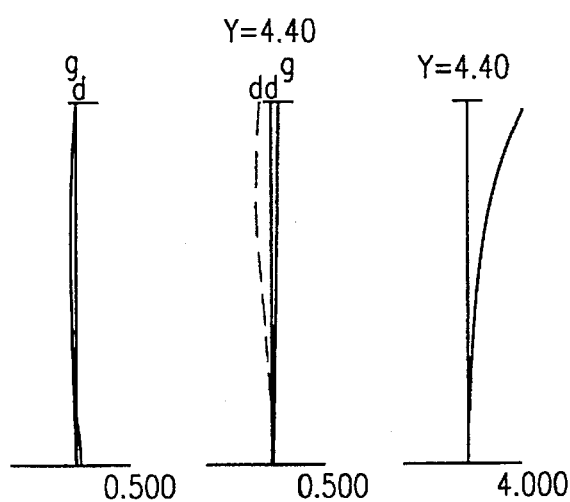
Figure 2C:
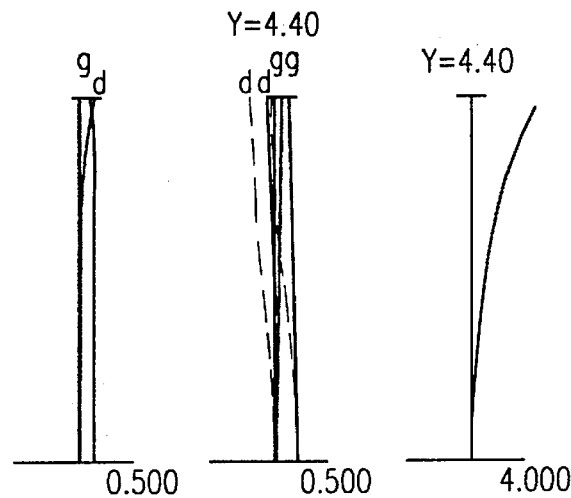
Figure 3A:
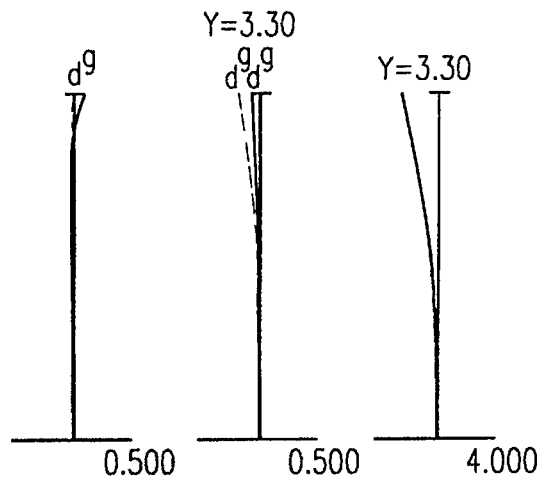
FIG. 3 shows various aberrations pertaining to the vertical direction of the first embodiment in which (a) shows the various aberrations pertaining to the maximum wide-angle state, (b) shows the various aberrations pertaining to the intermediate focal length state, and (c) shows the various aberrations pertaining to the maximum telephoto state.
Figure 3B:
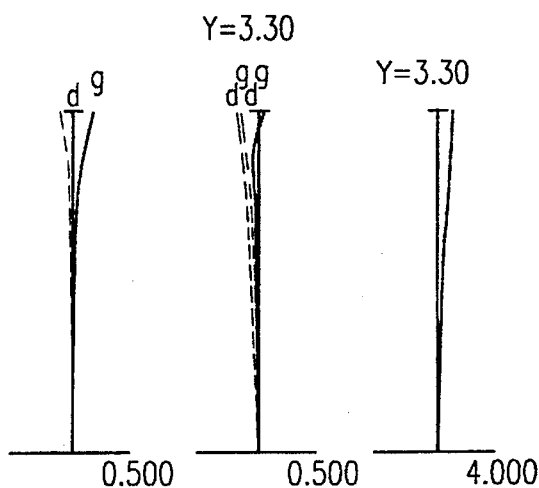
Figure 3C:
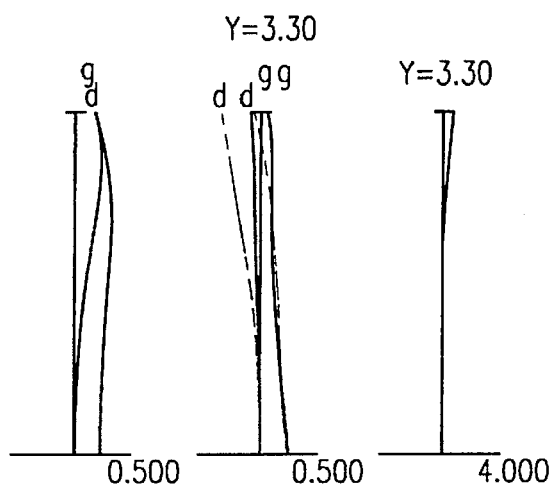

FIG. 2 includes the various aberrations pertaining to the horizontal direction of the first embodiment, and shows respectively (a) the various aberrations pertaining to the maximum wide-angle state, (b) the various aberrations pertaining to the intermediate focal length condition, (c) the aberrations pertaining to the maximum telephoto state. Also, FIG. 3 shows the various aberrations pertaining to the vertical direction of the first embodiment, which shows respectively (a) the various aberrations pertaining to the maximum wide-angle state, (b) the various aberrations pertaining to the intermediate focal length condition, and (c) the aberrations pertaining to the maximum telephoto state.

Each aberration diagram shows respectively Y as the image height, d as d line (λ=587.6 nm), g as g line (λ=435.8 nm).

Also, the solid line shows the sagittal image plane by means of the aberration diagram, which shows astigmatism. The broken line shows the meridional image plane. Moreover, the broken line shows the sine condition through the aberrations that show the spherical aberrations.

Through this embodiment, it is clear from each aberration diagram that satisfactory corrections of various aberrations against each focal distance condition are achieved in both the horizontal direction and the vertical direction.

Figure 4A:
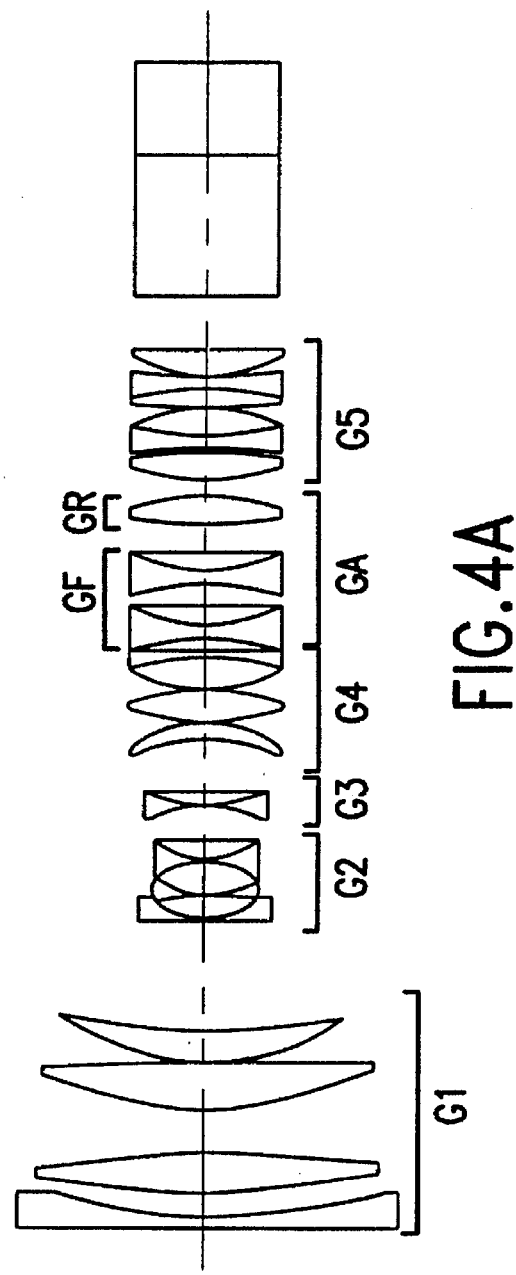
FIGS. 4(a) and 4(b) show the lens structure of the zoom lens of a second embodiment of the present invention.

FIG. 4A shows the lens construction of the zoom lens of a second embodiment of this invention.

The zoom lens of FIG. 4A is constructed of, in order from the object side, the first lens group G1 comprising a biconcave lens, a biconvex lens, a biconvex lens, and a positive meniscus lens with the convex surface facing the object side; the second lens group G2 comprising a negative meniscus lens with a convex surface facing the object side, a biconcave lens, and a cemented lens of a biconvex lens and a biconcave lens, and biconvex lens; the third lens group G3 comprising a cemented lens of a biconcave lens and a biconvex lens; the fourth lens group G comprising a positive meniscus lens with a concave surface facing the object side, a biconvex lens, and a cemented lens including the negative meniscus lens having the concave surface facing the object side, and a biconvex lens; and the fifth lens group G5 comprising, a biconvex lens, a cemented lens of a biconcave lens and a biconvex lens, a cemented lens of the negative meniscus lens with a concave surface facing the object side, and a biconvex lens, and a positive meniscus lens with the convex surface facing the object side.

Moreover, an anamorphic converter lens group GA positioned between the fourth lens group G4 and the fifth lens group G5 is composed, in the horizontal direction, of a front group GF comprising a cemented lens of a biconcave lens and a positive meniscus lens with the convex surface facing the convex surface the object side, a cemented lens of a biconvex lens and a biconcave lens and having negative refractive power overall, and the rear group GR comprising a biconvex lens and having positive refractive power overall. As illustrated, the anamorphic converter lens group GA has a cylindrical construction having refractive power in the horizontal direction and no refractive power in the vertical direction.

Table (2) displays various values for the second embodiment of this invention. Table (2) shows f as the focal length and Bf as the back focus. Moreover, the surface number shows the order of the lens surfaces from the object side along the direction of propagation of the light rays. The Abbe number and refractive index are also shown in relation to the various d lines ($\lambda=587.6$ nm).

Figure 4B:
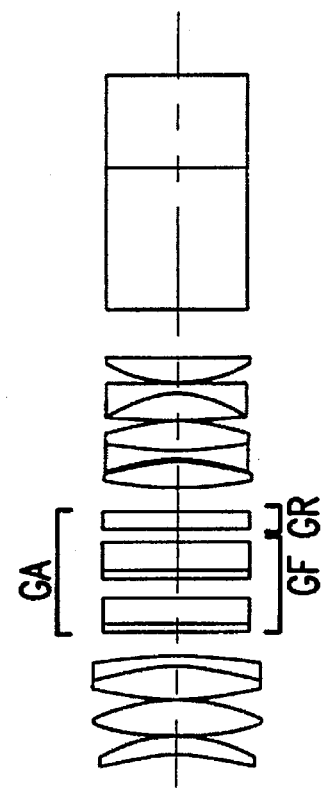

Moreover, Table (2) shows only the value pertaining to the horizontal direction as the curvature radius of each lens surface of the anamorphic converter lens group GA. Moreover, the curvature radius of each lens surface pertaining to the vertical direction of the anamorphic converter lens group GA is zero (flat plain). Also, parallel plane boards, such as the light division prism or various types of filters, can be positioned in the gap between the surface closest to the image side and the image plane to correct aberrations using these parallel plain boards as seen in FIG. 4B. The values of the parameters of these parallel plane boards are taken into account.

At the aspherical surface of each embodiment, the * symbol is used at the right side of the surface number.

TABLE 2

$f = 6.5 \sim 30 \sim 94$

| Surface number | Curvature Radius | Surface Space | Abbe number | Refraction Ratio |
|---|---|---|---|---|
| 1 | −453.573 | 1.9 | 23.82 | 1.84666 |
| 2* | 169.447 | 2.8 | | |
| 3 | 174.470 | 9.4 | 95.00 | 1.43875 |
| 4 | −150.519 | 6.9 | | |
| 5 | 94.922 | 8.7 | 82.52 | 1.49782 |
| 6 | −441.788 | 0.1 | | |
| 7 | 58.543 | 7.4 | 52.30 | 1.74810 |
| 8 | 197.358 | d8 = variable | | |
| 9 | 60.562 | 0.9 | 35.72 | 1.90265 |
| 10 | 11.692 | 5.5 | | |
| 11* | −55.558 | 0.9 | 52.30 | 1.74810 |
| 12 | 42.524 | 0.1 | | |
| 13 | 20.282 | 6.2 | 30.83 | 1.61750 |
| 14 | −17.643 | 0.9 | 46.54 | 1.80411 |
| 15 | 41.633 | 2.4 | 23.01 | 1.86074 |
| 16 | 5147.649 | d16 = variable | | |
| 17 | −24.915 | 0.9 | 52.30 | 1.74810 |
| 18 | 54.347 | 2.7 | 23.01 | 1.86074 |
| 19 | −402.411 | d19 = variable | | |
| 20 | −68.073 | 3.6 | 65.77 | 1.46450 |
| 21 | −27.589 | 0.1 | | |
| 22 | 52.987 | 5.4 | 70.41 | 1.48749 |
| 23 | −88.727 | 0.1 | | |
| 24 | 65.278 | 7.1 | 56.41 | 1.50137 |
| 25 | −39.536 | 1.2 | 39.82 | 1.86994 |
| 26 | −171.805 | 3.1 | | |
| 27 | −37.114 | 2.0 | 56.05 | 1.56883 |

TABLE 2-continued

| | | | | |
|---|---|---|---|---|
| 28 | 28.554 | 4.5 | 23.01 | 1.86074 |
| 29 | 508.281 | 4.4 | | |
| 30 | −49.297 | 1.5 | 35.51 | 1.59507 |
| 31 | 29.060 | 6.0 | 82.52 | 1.49782 |
| 32 | −111.347 | 6.3 | | |
| 33 | 144.233 | 5.0 | 82.52 | 1.49782 |
| 34 | −46.915 | 5.2 | | |
| 35 | 45.758 | 6.0 | 65.77 | 1.46450 |
| 36 | −56.878 | 0.7 | | |
| 37 | −71.071 | 1.0 | 39.82 | 1.86994 |
| 38 | 32.743 | 7.3 | 70.41 | 1.48749 |
| 39 | −42.526 | 0.1 | | |
| 40 | 157.576 | 5.4 | 48.97 | 1.53172 |
| 41 | −29.546 | 1.0 | 39.82 | 1.86994 |
| 42 | −130.985 | 0.1 | | |
| 43 | 29.193 | 4.4 | 70.41 | 1.48749 |
| 44 | 396.495 | 10.0 | | |
| 45 | ∞ | 30.0 | 38.03 | 1.60342 |
| 46 | ∞ | 16.2 | 64.10 | 1.51680 |
| 47 | ∞ | Bf =1.8046 | | |

(Aspherical surface data)

| | | | |
|---|---|---|---|
| Surface 2 | k | $C_2$ | $C_4$ |
| | 0.0000 | 0.0000 | 0.0000 |
| | $C_6$ | $C_8$ | $C_{10}$ |
| | $-7.45650 \times 10^{-12}$ | $8.91830 \times 10^{-15}$ | 0.0000 |
| Surface 11 | k | $C_2$ | $C_4$ |
| | 0.0000 | 0.0000 | $8.0940 \times 10^{-6}$ |
| | $C_6$ | $C_8$ | $C_{10}$ |
| | $-4.49290 \times 10^{-8}$ | $4.64690 \times 10^{-10}$ | 0.0000 |

(Variable space pertaining to variables)

| f | 6.5 | 30.0 | 94.0 |
|---|---|---|---|
| d8 | 0.75 | 34.49 | 45.47 |
| d16 | 47.84 | 9.18 | 3.70 |
| d19 | 4.88 | 9.90 | 4.40 |

(Conditions concerning values)

f1 = 66.5
f2 = −13.0
(1) $|f1/f2|^{-1/2} = 0.442$
(2) 2 Surface
 h = 35.15
 lx(h)l/h = 0.265
(2) 11 Surface
 h = 9.2
 lx(h)l/h = 0.055
(3) $\gamma = 0.73$ The exit pupil of the zoom lens in the state where the anamorphic converter lens group GA is released is positioned on the side opposite the object side separated by only 188.4 mm in relation to the image plane. Also, the composite focal length fAB of anamorphic converter lens group GA in the horizontal direction =1431.7 mm. In other words, the anamorphic converter lens group GA has positive refractive power in the horizontal direction.

In this regard, the focal length fA of the front group GF of the anamorphic converter lens group GA=−56.1 mm, and the focal length fB of rear group GR=71.7 mm.

Figure 5A:
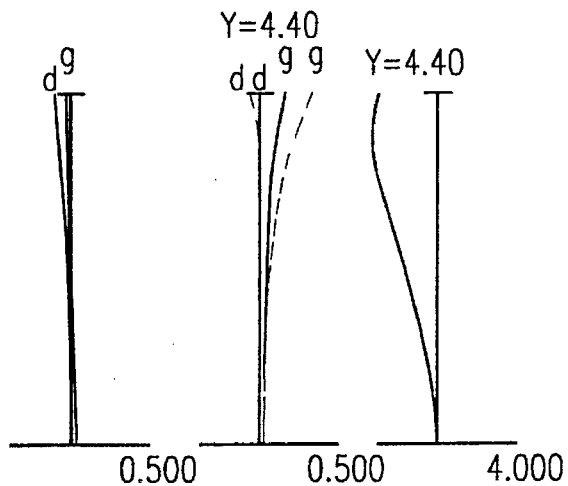
FIG. 5 shows the various aberrations pertaining to the horizontal direction of the second embodiment in which (a) shows the various aberrations pertaining to the maximum wide-angle state, (b) shows the various aberrations pertaining to the intermediate focal length state, and (c) shows the various aberrations pertaining to the maximum telephoto state.
Figure 5B:
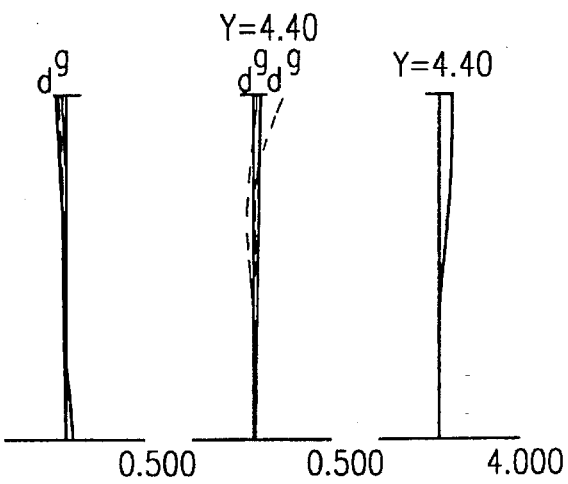
Figure 5C:
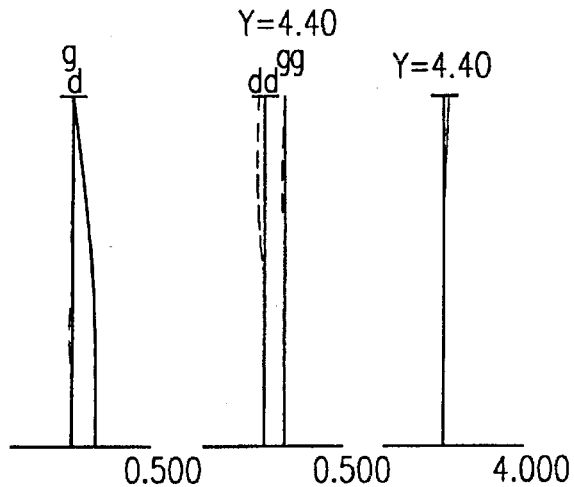

FIG. 5 shows the various aberration diagrams for the horizontal direction in the second embodiment. In the diagrams, (a) shows the various aberrations pertaining to the maximum wide-angle state, (b) shows the aberrations pertaining to the intermediate focal length state, and (c) shows the various aberrations pertaining to the maximum telephoto state.

Figure 6A:
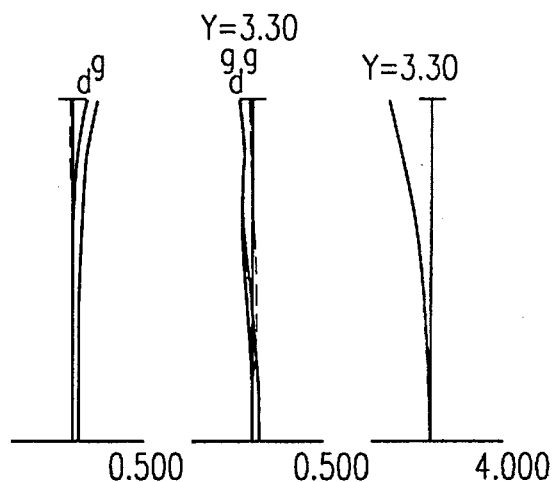
FIG. 6 shows the various aberrations pertaining to the vertical direction of the second embodiment in which (a) shows the various aberrations pertaining to the maximum wide-angle state, (b) shows the various aberrations pertaining to the intermediate focal length state, and (c) shows the various aberrations pertaining to the maximum telephoto state.
Figure 6B:
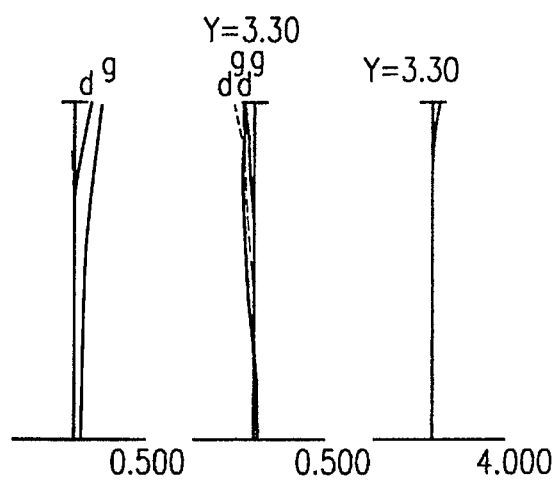
Figure 6C:
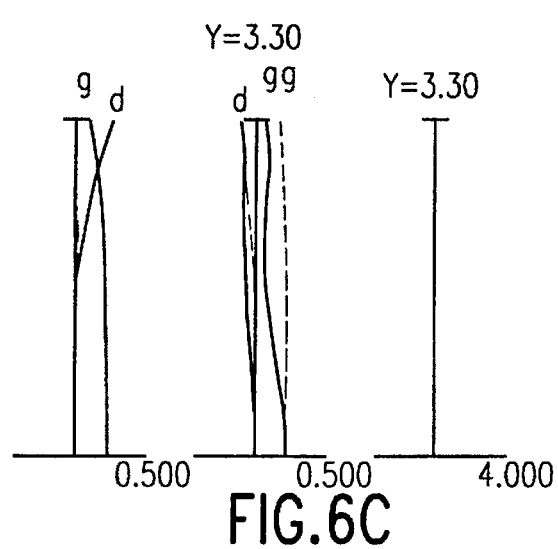

Also, FIG. 6 shows the various aberrations pertaining to the vertical direction of the second embodiment. In the figure, (a) shows the various aberrations pertaining to the maximum wide-angle state, (b) shows the various aberrations pertaining to the intermediate focal length state, and (c) shows the various aberrations pertaining to the maximum telephoto state.

Each of the aberration diagrams shows Y as the image height, d as d line ($\lambda$=587.6 nm), and g as the g line ($\lambda$=435.8 nm)

Also, the solid line shows the sagittal image plane at the aberration figure which shows astigmatism. The broken line shows the meridional image plane. Moreover, the broken line shows the sine condition at the aberration figure that shows spherical aberrations.

With the present embodiment, it is clear from each aberration diagram that satisfactory corrections of the various aberrations in relation to each focal length state in both the horizontal and vertical direction are achieved.

Moreover, the anamorphic converter lens group GA according to each above-mentioned embodiment has refractive power in the horizontal direction. Moreover, the zoom lens is a cylindrical construction without refractive power in the vertical direction. The toric construction can also be accomplished, which has refractive power that differs in the vertical direction and the horizontal direction.

As explained above, with respect to the present invention, a zoom lens with an anamorphic converter with a large aperture and a large zoom ratio is formed, without sacrificing small size, light weight, high precision, or high performance.

While this invention has been described in conjunction with specific embodiments thereof, it is evident that many alternatives, modifications, and variations will be apparent to those skilled in the art. Accordingly, the preferred embodiments of the invention as set forth herein are intended to be illustrative, not limiting. Various changes may be made without departing from the scope of the invention as defined in the following claims.

What is claimed is:

1. A zoom lens having lens groups arranged along an optical axis from an object side to an image side, comprising:

a first lens group nearest the object side having positive refractive power and being fixed along the optical axis;

a second lens group, nearer to the image side than the first lens group, having negative refractive power and being movable along the optical axis when the zoom lens shifts from a maximum wide-angle state to a maximum telephoto state;

a third lens group nearer to the image side than the second lens group and having one of positive or negative refractive power;

a fourth lens group nearer to the image side than the third lens group and having positive refractive power;

a fifth lens group nearest the image side having positive refractive power; and an anamorphic converter lens group, that has a first magnification within a specified plane including the optical axis and a second magnification within a plane intersecting perpendicularly with the specified plane, wherein the anamorphic converter lens group is freely attachable and detachable in the optical path between the fourth lens group and the fifth lens group, the anamorphic converter lens group comprising:

a front group nearest the object side with negative refractive power within the specified plane, and a rear group nearer the image side with positive refractive power within the specified plane, wherein the anamorphic converter lens group has an angle magnification $\gamma$ wherein $0.5<\gamma<1.0$.

2. The zoom lens of claim 1, wherein a condition of $0.3<|f1/f2|^{-1/2}<0.9$ is satisfied, in which f1 is a focal length of the first lens group and f2 is a focal length of the second lens group.

3. The zoom lens of claim 1, wherein at least one of the lens groups has at least one lens surface that is aspherical in shape.

4. The zoom lens of claim 1, wherein the first lens group has at least one aspherical lens of positive refractive power with an aspherical surface and a lens perimeter, and the aspherical surface is formed such that the positive refractive power of the aspherical lens gradually decreases from the optical axis towards the aspherical lens perimeter and $0.0001<|x(h)|/h<0.1$ is satisfied, in which h is the maximum effective diameter of the aspherical lens, and x(h) is the aspherical amount pertaining to the height of h on the aspherical lens.

5. The zoom lens of claim 1, wherein the second lens group comprises an aspherical lens of positive refractive power having an aspherical surface and a lens perimeter, the aspherical surface being formed such that the positive refractive power of the aspherical lens gradually increases from the optical axis towards the aspherical lens perimeter and $0.0001<|x(h)|/h<0.1$ is satisfied, in which h is the maximum effective diameter of the aspherical lens, and x(h) is the aspherical amount pertaining to the height of h on the aspherical lens.

6. The zoom lens of claim 1, wherein the third lens group is constructed to be movable along the optical axis in order to correct movement of an image plane in accordance with magnification.

7. The zoom lens of claim 1, wherein at least part of said fourth lens group is movable along the optical axis in order to correct movement of an image plane in accordance with magnification.

8. The zoom lens of claim 1, wherein at least part of the fifth lens group is movable along the optical axis in order to correct movement of an image plane in accordance with magnification.

9. The zoom lens of claim 1, wherein the anamorphic converter lens group has negative composite refractive power within the specified plane when an exit pupil of the zoom lens in a state in which the anamorphic converter lens group is released is positioned closer to the object side than the image side, and a positive composite refractive power within the specified plane when the exit pupil of said zoom lens in a state in which said anamorphic converter lens group is released is positioned nearer the image side than the object side.

10. The zoom lens of claim 1, wherein a lens surface closest to the object side of the anamorphic converter lens group is a convex surface facing the image side within the specified plane.

11. The zoom lens of claim 1, wherein the anamorphic converter lens group comprises at least one of a prism and parallel plane boards.

12. A zoom lens having lens groups arranged along an optical axis from an object side to an image side, comprising:

a first lens group nearest the object side having positive refractive power and being fixed along the optical axis;

a second lens group, nearer to the image side than the first lens group, having negative refractive power and being movable along the optical axis when the zoom lens shifts from a maximum wide-angle state to a maximum telephoto state;

a third lens group nearer to the image side than the second lens group and having one of positive or negative refractive power;

a fourth lens group nearer to the image side than the third lens group and having positive refractive power; a fifth lens group nearest the image side having positive refractive power; and an anamorphic converter lens group having a first magnification within a specified plane, including the optical axis and a second magnification within a plane intersecting perpendicularly to the specified plane, wherein the anamorphic converter lens group is freely attachable and detachable in the optical path between the fourth lens group and the fifth lens group, the anamorphic converter lens group comprising, a front group nearest the object side with negative refractive power within the specified lane, a rear group nearer the image side with positive refractive power within the specified plane, and at least a cemented lens in at least one of the rear group and the front group, wherein the anamorphic converter lens group has an angle magnification $\gamma$ wherein $0.5<\gamma<1.0$, and wherein the zoom lens satisfies $0.3<|f1/f2|^{-1/2}<0.9$, in which f1 is the focal length of the first lens group and f2 is the focal length of the said second lens group, and at least one lens surface is aspherical in shape in at least one of the lens groups, wherein the anamorphic converter lens group has negative composite refractive power within the specified plane, when an exit pupil of said zoom lens in the state in which the anamorphic converter lens group is released is positioned closer to the object side than the image side, and has a positive composite refractive power within the specified plane, when the exit pupil of said zoom lens in the state in which said anamorphic converter lens group is released is positioned nearer the image side than the object side.

13. The zoom lens of claim 12, wherein the first lens group has an aspherical lens of positive refractive power having at least one aspherical surface and a lens perimeter the aspherical surface being formed such that the positive refractive power of the aspherical lens gradually decreases from the optical axis towards the aspherical lens perimeter and $0.0001<|x(h)|/h<0.1$ is satisfied when h is the maximum effective diameter of the aspherical lens, and x(h) is the aspherical amount pertaining to the height of h on the aspherical lens.

14. The zoom lens of claim 12, wherein the second lens group comprises a lens of positive refractive power having an aspherical surface and a lens perimeter, the aspherical surface being formed such that the positive refractive power of the aspherical lens gradually increases from the optical axis towards the aspherical lens perimeter and $0.0001<|x(h)|/h<0.1$ is satisfied in which h is the maximum effective diameter of the aspherical lens and x(h) is the aspherical amount pertaining to the height of h on the aspherical lens.

15. The zoom lens of claim 12, wherein a lens surface closest to the object side of the anamorphic converter lens group is a convex surface facing the image side.

16. A zoom lens having lens groups arranged along an optical axis from an object side to an image side, comprising:

a first lens group nearest the object side having positive refractive power and being fixed along the optical axis;

a second lens group nearer to the image side than the first lens group having negative refractive power and being movable along the optical axis when the zoom lens shifts from a maximum wide-angle state to a maximum telephoto state;

a third lens group nearer to the image side than the second lens group having one of positive or negative refractive power;

a fourth lens group nearer to the image side than the third lens group having positive refractive power wherein at least part of the fourth lens group is movable along the optical axis in order to correct movement of an image plane in accordance with magnification;

a fifth lens group nearest the image side having positive refractive power; and an anamorphic converter lens group having a first magnification within a specified plane including the optical axis and a second magnification within a plane intersecting perpendicularly with the specified plane, wherein the anamorphic converter lens group is freely attachable and detachable in the optical path between said fourth lens group and said fifth lens group, wherein the anamorphic converter lens group comprises, a front group nearest the object side with negative refractive power within the specified plane, a rear lens group nearer the image side with positive refractive power within said specified plane, and at least a cemented lens within at least one of the front group and the rear group, wherein an angle magnification $\gamma$ of the said anamorphic converter lens group satisfies $0.5<\gamma<1.0$, wherein the zoom lens satisfies $0.3<|f1/f2|^{-1/2}<0.9$, in which f1 is a focal length of the first lens group and f2 is a focal length of the second lens group, wherein the anamorphic converter lens group has negative composite refractive power within the specified plane when an exit pupil of said zoom lens in the state in which said anamorphic converter lens group is released is positioned closer to the object side than the image side and has a positive composite refractive power within the specified plane when an exit pupil of the zoom lens in the state in which the anamorphic converter lens group is released is positioned nearer the image side than the object side.

17. The zoom lens of claim 16, wherein the first lens group has at least one aspherical lens of positive refractive power with an aspherical surface and a lens perimeter, and the aspherical surface is formed such that the positive refractive power of the aspherical lens gradually decreases from the optical axis towards the aspherical lens perimeter and $0.0001<|x(h)|/h<0.1$ is satisfied, in which h is the maximum effective diameter of th aspherical lens, and x(h) is the aspherical amount pertaining to the height of h on the aspherical lens.

18. The zoom lens of claim 16, wherein the second lens group comprises an aspherical lens of positive refractive power having an aspherical surface and a lens perimeter, the aspherical surface being formed such that the positive refractive power of the aspherical lens gradually increases from the optical axis towards the aspherical lens perimeter and $0.0001<|x(h)|/h<0.1$ is satisfied in which h is the maximum effective diameter of the aspherical lens, and x(h) is the aspherical amount pertaining to the height of h on the aspherical lens.

19. The zoom lens of claim 16, wherein a lens surface closest to the object side of the anamorphic converter lens group is a convex surface facing the image side within the specified plane.

20. A zoom lens having lens groups arranged along an optical axis from an object side to an image side, comprising:

a first lens group nearest the object side having positive refractive power and being fixed along the optical axis;

a second lens group nearer to the image side than the first lens group having negative refractive power and being movable along the optical axis when the zoom lens shifts from a maximum wide-angle state to a maximum telephoto state;

a third lens group nearer to the image side than the second lens group having one of positive or negative refractive power;

a fourth lens group nearer to the image side than the third lens group having positive refractive power;

a fifth lens group having positive refractive power wherein all or a part of said fifth lens group is movable along the optical axis in order to correct movement of the image plane in accordance with magnification; and an anamorphic converter lens group having a first magnification within a specified plane including the optical axis and a second magnification within a plane intersecting perpendicularly with the specified plane wherein the anamorphic converter lens group is freely attachable and detachable in the optical path between the fourth lens group and the fifth lens group wherein the anamorphic converter lens group comprises, a front group nearest the object side with negative refractive power within the specified plane, a rear group nearer the image side with positive refractive power within said specified plane, and at least a cemented lens within at least one of the rear group and the front group, wherein an angle magnification $\gamma$ of the said anamorphic converter lens group satisfies $0.5<\gamma<1.0$, wherein the zoom lens satisfies $0.3<|f1/f2|^{-1/2}<0.9$, in which f1 is a focal length of the first lens group and f2 is a focal length of the second lens group, and wherein the anamorphic converter lens group has negative composite refractive power within the specified plane when an exit pupil of the zoom lens in the state in which said anamorphic converter lens group is released is positioned closer to the object side than the image side and a positive composite refractive power within the specified plane when the exit pupil of the zoom lens in the state in which said anamorphic converter lens group is released is positioned nearer the image side than the object side.

21. The zoom lens of claim 20, wherein the first lens group has at least one aspherical lens of positive refractive power with an aspherical surface and a lens perimeter, and the aspherical surface is formed such that the positive refractive power of the aspherical lens gradually decreases from the optical axis towards the aspherical lens perimeter and $0.0001<|x(h)|/h<0.1$ is satisfied in which h is the maximum effective diameter of the aspherical lens, and x(h) is the aspherical amount pertaining to the height of h on the aspherical lens.

22. The zoom lens of claim 20, wherein the second lens group comprises an aspherical lens of positive refractive power having an aspherical surface and a lens perimeter, the aspherical surface being formed such that the positive refractive power of the aspherical lens gradually increases from the optical axis towards the aspherical lens perimeters and $0.0001<|x(h)|/h<0.1$ is satisfied in which h is the maximum effective diameter of the aspherical lens, and x(h) is the aspherical amount pertaining to the height of h on the aspherical lens.

23. The zoom lens of claim 20, wherein a lens surface closest to the object side of the anamorphic converter lens group is a convex surface facing the image side.

* * * * *